United States Patent
Kantner et al.

[11] Patent Number: 5,936,841
[45] Date of Patent: Aug. 10, 1999

[54] PCMCIA RF CONNECTOR

[75] Inventors: Edward A. Kantner, Raleigh; Daniel S. Garriss, Dunn, both of N.C.

[73] Assignee: International Business Machines Corporation, Armonk, N.Y.

[21] Appl. No.: 08/778,325

[22] Filed: Jan. 2, 1997

Related U.S. Application Data

[60] Provisional application No. 06/009,676, Jan. 2, 1996.

[51] Int. Cl.$^6$ .................................................. H05K 7/10
[52] U.S. Cl. .............................................. 361/737; 235/451
[58] Field of Search .................... 439/64, 950; 361/686, 361/737; 333/24 C; 336/DIG. 2; 235/492, 493, 451, 472.02

[56]     References Cited

U.S. PATENT DOCUMENTS

| | | | |
|---|---|---|---|
| 4,700,152 | 10/1987 | Wilson | 333/24 |
| 4,712,250 | 12/1987 | Michels et al. | 455/20 |
| 4,763,340 | 8/1988 | Yoneda et al. | |
| 4,795,898 | 1/1989 | Bernstein et al. | 235/493 |
| 4,818,855 | 4/1989 | Mongeon et al. | 235/451 |
| 4,835,373 | 5/1989 | Adams et al. | 235/451 |
| 4,876,535 | 10/1989 | Ballmer et al. | 235/451 |
| 4,918,416 | 4/1990 | Walton et al. | 235/493 |
| 4,931,991 | 6/1990 | Cvijanovich | 235/451 |
| 4,960,983 | 10/1990 | Inoue | 235/493 |
| 5,057,847 | 10/1991 | Vaisanen | 343/702 |
| 5,073,761 | 12/1991 | Waterman et al. | 333/24 |
| 5,105,201 | 4/1992 | Nakase et al. | 343/715 |
| 5,264,064 | 11/1993 | Hughes | 156/281 |
| 5,267,218 | 11/1993 | Elbert | 365/226 |
| 5,296,692 | 3/1994 | Shino | 235/492 |
| 5,302,947 | 4/1994 | Fuller et al. | 340/825.34 |
| 5,440,449 | 8/1995 | Scheer | 361/730 |
| 5,515,595 | 5/1996 | Kurz | 235/492 |
| 5,517,387 | 5/1996 | Smith | 439/259 |
| 5,574,273 | 11/1996 | Nakagawa | 235/441 |
| 5,608,606 | 3/1997 | Blaney | 439/64 |

FOREIGN PATENT DOCUMENTS

| | | |
|---|---|---|
| 57-145402 | 8/1982 | Japan . |
| 2148605 | 10/1983 | United Kingdom . |
| 94/06169 | 3/1994 | WIPO . |
| 95/35016 | 12/1995 | WIPO . |

OTHER PUBLICATIONS

Electronics Now, Jun., 1995, pp. 31–36 "PC Cards".

*Primary Examiner*—Neil Abrams
*Attorney, Agent, or Firm*—John D. Flynn; Winstead, Sechrest, Minick

[57]     ABSTRACT

An RF connector is provided for a PC card by having one element (40) of an RF connector in the host device into which the card is inserted. The card has a second element (30) of the RF connector. The two elements are arranged opposite each other when the card is fully inserted into the host device. In this way, a capacitive coupling can be provided between the respective circuits of the card and the host device. RF signals may, accordingly, be transmitted to and from the host device and the PC card.

12 Claims, 3 Drawing Sheets

PCMCIA RF CONNECTOR

This application claims the benefit of U.S. Provisional application Ser. No. 60/009,676, filing date Jan. 2, 1996,

FIELD OF THE INVENTION

The present invention relates to a PCMCIA card which is a Portable Computer Memory Card International Association adapted for computer use. More particularly, this invention relates to a method and apparatus for providing a radio frequency (RF) connector between a PCMCIA card and a host device into which the card is inserted.

BACKGROUND OF THE INVENTION

The PCMCIA card, which is a credit card-sized device, has been developed and standardized by an international association so that it can be utilized universally. This card plugs into a slot arranged on the computer which is a host device. The purpose of using such a card is to provide access to items such as additional random access memory (RAM), hard disk space, a modem, or, at times, even a network.

Most portable computers utilized today provide slots for PCMCIA cards (hereinafter called PC cards), and even some desktop computer models are beginning to appear on the market with such slots available. The PC card has a plurality of terminals, generally at one end of the card, and these terminals correspond and cooperate with opposite terminal arranged in the host device, such as the portable computer. Generally, the card contains the female connectors, and the host device contains the male connectors. A recent article discussing the development and use of PC cards, appears in the publication *Electronics Now*, Jun. 1995, pages 31–36. This article points out the different sizes of PC cards which have been standard by the Personal Computer Memory Card International Association.

There are, at present, at least three different size cards Type I, Type II and Type III. The external size of the cards are the same, roughly 54×85.6 mm. However, the thickness of the Type I card is 3.3 mm; the Type II card 5.0 mm and the Type III card 10.5 mm. The Type I card is generally used for providing increased memory since it is too thin to carry many additional elements. The Type II card, being somewhat thicker, can hold additional memory and input/output features. The thickest, Type III, card is large enough to accommodate a complete hard drive or a radio communication device. It should be noted that even though the three cards are three different thicknesses, the connecting area is still the same so that a PC slot in a host device can make connections to any one of the three cards since the interconnect area is still the same dimension.

The connectors or terminals provided with the normal PC cards make electrical contact with the host device so that the circuit or circuits arranged on the card can be integrated and utilized with the circuits already on the portable or desktop computer serving as the host device. Such terminals provide good electrical connections. However, for radio frequency purposes, in which high frequencies are to be transmitted between the circuit or circuits on the card and the circuit or circuits in the host device, such mechanical connections are not satisfactory.

Attempts have been made to use coaxial connectors which could provide an RF connection, but because of the size of the card, space is generally not available and such arrangements are only awkwardly utilize for examination,(see the Article mentioned above which illustrates a digital video PC card having RF coaxial connectors). Such card has a cable attachment to accommodate the RF coaxial connectors.

Other uses have been proposed for the PC card, such as a radio transceiver for industrial, scientific and medical (ISM) applications between 2.4 GHz and 2.435 GHz. Such cards would be Type III PC cards.

SUMMARY OF THE INVENTION

Accordingly, it is an object of the present invention to provide a new and improved RF connection between a PCMCIA card and a host device into which such card is inserted.

A feature of the present invention is to provide an RF connection between a PC card and a host device without any physical interconnection between the PC card and the host device.

A further feature of the present invention is to provide the RF connection in the form of a capacitive connection.

Another feature of the present invention is to have one element of the RF connector arranged in the host device, while a second element of such connector is arranged in the PC card. When a capacitive connection is used, for example, an electrically conductive plate, which is generally planar in shape, is mounted in the host device. The second element of the RF connection is a second electrically conductive planar plate arranged in the PC card. Thus, when the card is inserted into the host device and the respective terminals cooperate with each other, the two electrically conductive plates are arranged opposite to each other. They therefore form a capacitor having a dielectric material between the plates. Such capacitor will operate as the RF connector without any physical interconnection.

These and other features and advantages of the present invention will become more apparent with reference to the following detailed description and drawings.

DETAILED DESCRIPTION OF THE INVENTION

Figure 1:
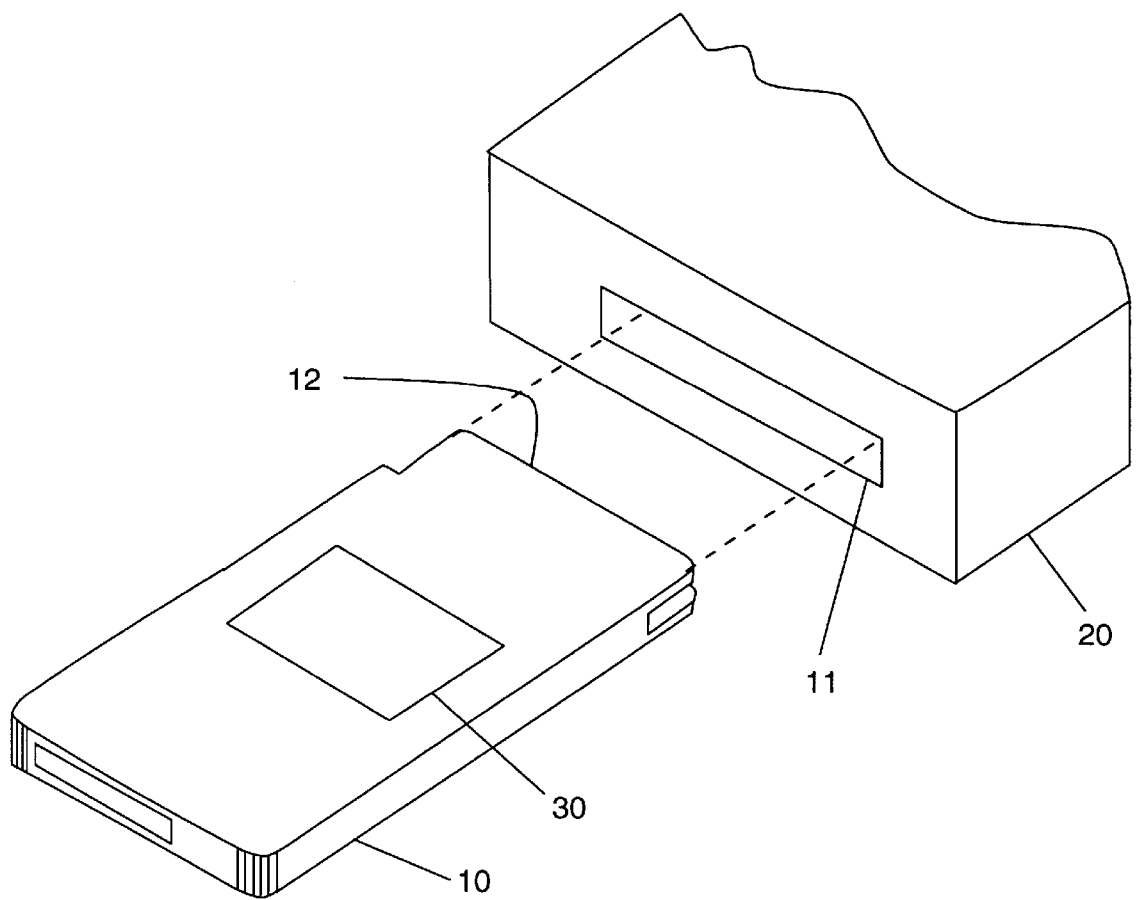
FIG. 1 is a three-dimensional view, partial broken away, to show the arrangement of the PC card being inserted into a host device.

With reference now to the Figures, and, in particular, with reference to FIG. 1, there is shown a dimensional view of a PC card 10 about to be inserted into a slot 11 of a host device 20. As can be seen from FIG. 1, the card 10 is similar in size to a credit card, for example. At the end 12 of the card 10 are arranged a series of terminal, best seen in FIG. 2. These are terminals, generally female terminals, adapted to mesh with male terminals in the host device 20 when the card 10 is fully inserted therein.

Figure 2:
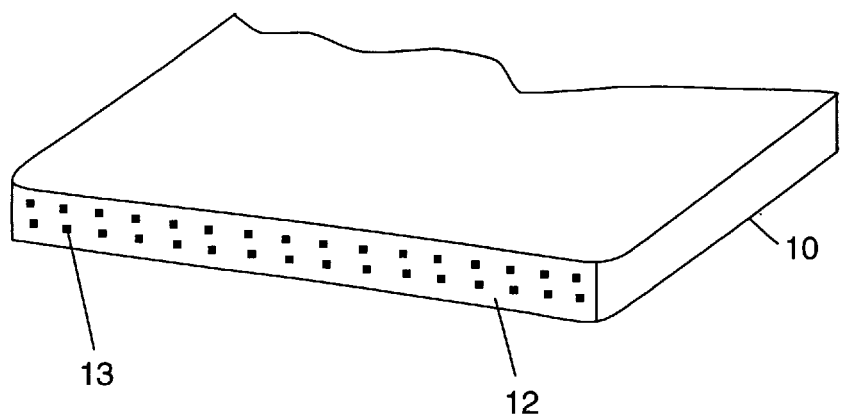
FIG. 2 is a three-dimensional view showing the end of the PC card, having the terminals mounted thereon.

In FIG. 2, the end 12 of the card 10 is shown having a plurality of female terminals 13.

Figure 3:
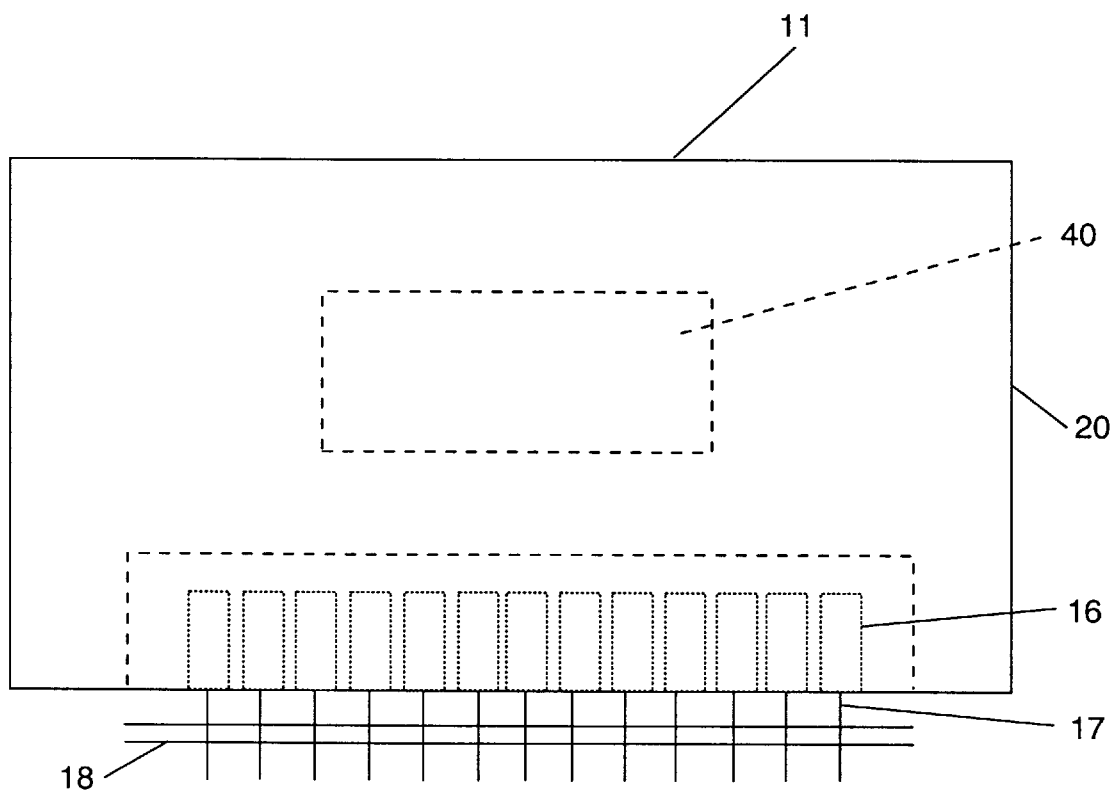
FIG. 3 is a plan view of the host device into which the PCMCIA card is inserted.

Referring now to the plane view of the host device 20 of FIG. 3, the slot 11 for admitting the card 10 is arranged opposite a plurality of terminals 16, as shown at the far end of the device 20. The terminals 16 are generally coupled, respectively, to a plurality of conductors 17, which may be bound into a cable 18. As is well known, the host device can be incorporated in a portable computer, such as a laptop computer. By having the host device arrangement in the computer, it is possible to add a number of features to the computer by inserting different PC cards.

When the card 10 is fully inserted into the host device 20, the terminals 13 of the card 10 will cooperate or mesh with the terminals 16 of the host device 20. With such an arrangement, the electrical connections from the circuit or circuits on the card 10 are made to the circuit or circuits in the host device 20. Thus, if random access memory is to be added, for example, the appropriate connections will be made. If the card contains a modem to be utilized by the computer containing the host device, the connections will provide such circuit features. Such arrangements are well known and need not be elaborated here.

Not only will the electrical connections be made, but the mechanical or physical connections between the card and the host device will also generally be made by the cooperation of the terminals 13 and 16. Thus, the PC card 10 will be held or positioned in a fixed position in the host device by the plurality of terminals cooperating with each other. As a general rule, the PC card can have 68 terminals arranged in two tiers of 34 terminals each. In this way, the mechanical mounting, as well as proper positioning, is assured.

As noted above, while the cooperation or meshing of the connectors 13 and 16 will bring about the proper electrical connections and mechanical positioning, it will not provide good radio frequency connections. Therefore, if there is a circuit or circuits on the PC card which is to be coupled to circuits in the computer or other apparatus incorporating the host device, these terminal connections will not provide appropriate radio frequency couplings.

As discussed above, coaxial connections at the end of the PC card, with a full connection with the backplane for connections with the antenna, have been attempted. This is awkward, as the connection may not be complete, and it is possible that there will be a mismatch, causing a substantial power loss. It is obvious that RF connectors in general, particularly of a coaxial nature, are somewhat bulky. This will hinder the miniaturization both of the host device in the portable PC as well as the PC card.

Figure 4:
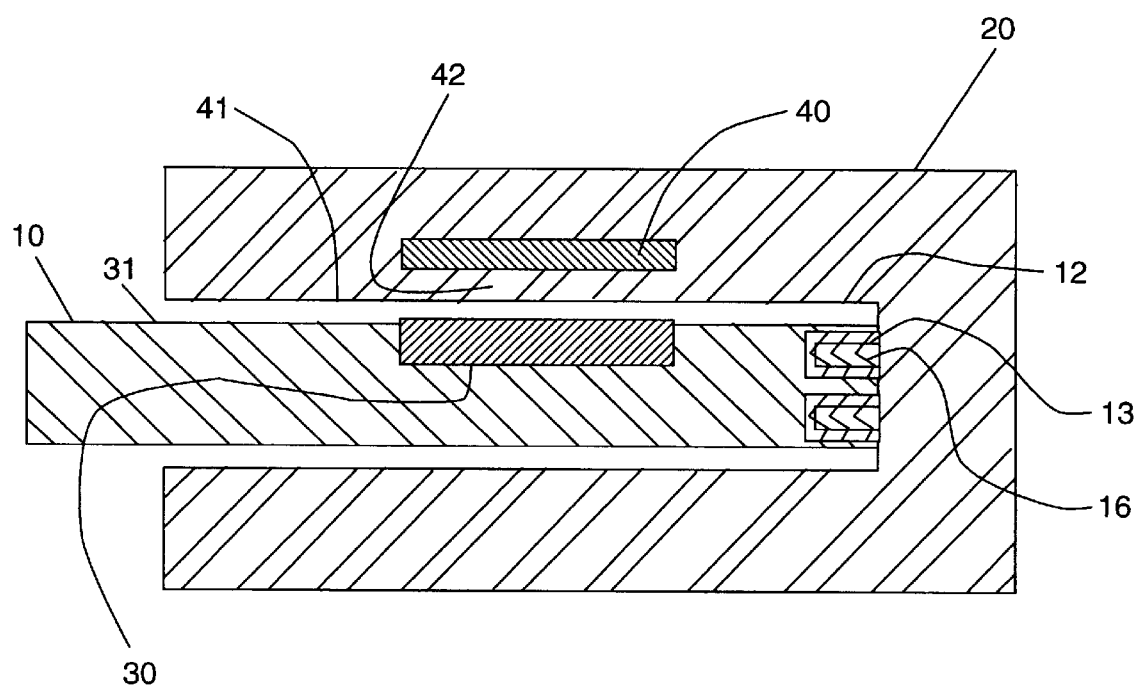
FIG. 4 is a cross-sectional view of the PC card fully inserted into the host device.

Referring now to FIG. 4, a cross-sectional view of the card 10 fully inserted in the host device 20 is illustrated. It can be seen that at the end 12 of the card 10, the terminals 13 and 16 of the card and the host device are meshed with each other and cooperating. Arranged within the card 10 is shown an electrically conductive member 30, which is generally planar in shape. In the illustrated position, the member 30 is arranged directly opposite a planar electrically conductive member 40 mounted in the upper half of the host device 20. The card 10 and the device 20 are generally made of an electrically nonconductive material, such as an appropriate plastic.

In accordance with the provisions of the present invention, the plates 30 and 40 arranged opposite to each other, form the opposite plates of a capacitor with the card 10 and the host device 20 forming the dielectric 42 of the capacitor. The connections to the plates of the device and the card are not shown in order to avoid unnecessarily complicating the drawing. However, it is clear that once the card 10 is inserted in the device 20, with the terminals 13 and 16 being meshed with each other, that the physical positions of the planar members or plates 30 and 40 of the capacitor, will be fixed. Thus, any radio frequency signals that are to be transmitted from the card to the host device apparatus, or vice versa, can be transmitted through this capacitive connection. Note that the RF coupling in the form of the capacitor plates 30 and 40 is achieved without any physical interconnections between the plates.

While the members 30 and 40 are illustrated as being spaced from the respective surfaces of the bodies in which they are mounted, this is shown in exaggerated form only. Thus, the plate 40 may be very close to or part of the surface 41 of the channel in which the card 10 is inserted. Similarly, the planar member 30 may be arranged closer to or be part of the upper surface 31 of the card 10. With such an arrangement, the operation of the capacitor can be easily facilitated.

It is thus clear that with the arrangement of the illustrated embodiment incorporating the features of the present invention, RF signals may be easily transmitted between the card 10 and the computer housing the host device 20, and vice versa. This RF connection is provided with a minimum of space being taken up in the small credit card-sized PC card and the small host device. It would be possible to provide such an arrangement in any one of the three type of cards presently available, since the capacitive coupling members take up very little additional space. It is clear that additional embodiments may be provided. For example, each of the host device and the card may have more than one capacitor plate, so that a plurality of RF couplings may be made between the card and the host device and vice versa.

It will be evident that various modifications and changes may be made without departing from the spirit and the scope of the invention as set forth in the appended claims.

What is claimed is:

1. A non-coaxial RF connector for use with a PC card, said card having at least one circuit mounted therein, a plurality of first terminals mounted on said card, said circuit being electrically connected to one or more of said terminals, said card being adapted to be inserted into a host device having a plurality of second terminals for contacting said terminals on said card, said RF connector being made up of at least two elements, one of said elements being part of said card and the other of said elements being part of said host device whereby, when said card is inserted into said host device, said first and second terminals contact each other and said elements are arranged in respective preselected positions, with each element being spaced from the other element to complete a non-contacting RF connection between said respective elements of said card and said host device and permit RF signals to be transmitted from said card to said device and vice versa.

2. An RF connector, as claimed in claim 1, wherein said elements are each part of a capacitor and said RF connector is a capacitive connector.

3. An RF connector, as claimed in claim 2, wherein said two elements of said RF connector are electrically conductive planar members, one of said members being substantially stationary and mounted in said host device and the other of said members being contained in said card.

4. An RF connector, as claimed in claim 3, wherein said planar members are parallel to and spaced from each other a predetermined distance when said card is inserted into said host device and said respective terminals of said card and said host device are in contact with each other.

5. An RF connector, as claimed in claim 4, wherein said first terminals mounted on said card are mounted at one end thereof so that the distance that said card can be inserted into said host device is determined by the position of said second contacting terminals of said host device.

6. An RF connector, as claimed in claim 1, wherein said RF connector is in the form of a capacitor and the material from which said host device is made serves as the dielectric material for said capacitor.

7. A non-coaxial RF connector for use with a PC card, said card having a standard shape and having at least one circuit mounted therein, a plurality of first terminals mounted on said card, said circuit being electrically connected to one or more of said terminals, said card being adapted to be inserted into a host device having a plurality of second terminals for contacting said terminals on said card, said RF connector being made up of at least two elements, one of said elements being part of said card and the other of said elements being part of said host device whereby, when said card is inserted into said host device, said first and second terminals contact each other and said elements are arranged in respective preselected positions, with each element being spaced from the other element to complete a non-contacting RF connection between said respective elements of said card and said host device and permit RF signals to be transmitted from said card to said device and vice versa.

8. An RF connector, as claimed in claim 7, wherein said elements are each part of a capacitor and said RF connector is a capacitive connector.

9. An RF connector, as claimed in claim 8, wherein said two elements of said RF connector are electrically conductive planar members, one of said members being substantially stationary and mounted in said host device and the other of said members being contained in said card.

10. An RF connector, as claimed in claim 9, wherein said planar members are parallel to and spaced from each other a predetermined distance when said card is inserted into said host device and said respective terminals of said card and said host device are in contact with each other.

11. An RF connector, as claimed in claim 10, wherein said first terminals mounted on said card are mounted at one end thereof so that the distance that said card can be inserted into said host device is determined by the position of said contacting terminals of said host device.

12. An RF connector, as claimed in claim 7, wherein said RF connector is in the form of a capacitor and the material from which said host device is made serves as the dielectric material for said capacitor.

* * * * *

UNITED STATES PATENT AND TRADEMARK OFFICE
CERTIFICATE OF CORRECTION

PATENT NO. : 5,936,841
DATED : August 10, 1999
INVENTOR(S) : Edward A. Kantner & Daniel S. Garriss It is certified that error appears in the above-identified patent and that said Letters Patent is hereby corrected as shown below:

Title Page item

[60], Change 06/009,676 to -- 60/009,676--.

Signed and Sealed this

Twenty-fifth Day of April, 2000

Attest:

Q. TODD DICKINSON

Attesting Officer

Director of Patents and Trademarks